INVENTOR.
EDWARD F. KLEINSCHMIDT
CARL P. ANDERSON
HILDING A. ANDERSON
CLAYTON H. CLARK
DAVID C. SHERRICK
BY
[signature]
ATTORNEYS

RECEIVER AND SELECTOR MECHANISM

Original Filed Dec. 13, 1956 5 Sheets-Sheet 2

INVENTOR.
EDWARD F. KLEINSCHMIDT
CARL P. ANDERSON
BY HILDING A. ANDERSON
CLAYTON H. CLARK
DAVID C. SHERRICK
Strauch, Nolan + Neale
ATTORNEYS June 1, 1965 E. F. KLEINSCHMIDT ET AL 3,187,096

RECEIVER AND SELECTOR MECHANISM

Original Filed Dec. 13, 1956 5 Sheets-Sheet 3

INVENTOR.
EDWARD F. KLEINSCHMIDT
CARL P. ANDERSON
BY HILDING A. ANDERSON
CLAYTON H. CLARK
DAVID C. SHERRICK

Steuck, Nolan & Neale
ATTORNEYS

INVENTOR.
EDWARD F. KLEINSCHMIDT
CARL P. ANDERSON
HILDING A. ANDERSON
CLAYTON H. CLARK
DAVID C. SHERRICK
BY
Strauch, Nolan & Neale
ATTORNEYS

RECEIVER AND SELECTOR MECHANISM

Original Filed Dec. 13, 1956 5 Sheets-Sheet 5

INVENTOR.
EDWARD F. KLEINSCHMIDT
CARL P. ANDERSON
HILDING A. ANDERSON
CLAYTON H. CLARK
DAVID C. SHERRICK
BY Strauch, Nolan & Neale
ATTORNEYS

United States Patent Office 3,187,096

Patented June 1, 1965

3,187,096

RECEIVER AND SELECTOR MECHANISM

Edward F. Kleinschmidt, Wilmette, Carl P. Anderson, Evanston, Hilding A. Anderson, Lake Zurich, Clayton H. Clark, Mundelein, Ill., and David C. Sherrick, Bethesda, Md., assignors to SCM Corporation, New York, N.Y., a corporation of New York Original application Dec. 13, 1956, Ser. No. 628,110, now Patent No. 2,982,810, dated May 2, 1961. Divided and this application Mar. 1, 1961, Ser. No. 92,503
18 Claims. (Cl. 178—33)

This invention relates to printing telegraph receiving and selecting mechanism and has particular reference to reception mechanisms for such telegraphic systems wherein is employed the well-known five unit Baudot code. This application is a division from co-pending application Serial No. 628,110, filed December 13, 1956, now Patent No. 2,982,810, issued May 2, 1961.

With the increasing use of interoffice telegraphy and integrated data processing systems, it is advantageous to transmit the units of a code group in simultaneous form over a plurality of wires. By using simultaneous transmission, less complex and higher speed translators can be used at the various receiving machines. Along with the use of simultaneous transmission systems, referred to above, it may be desired and is often necessary to transmit the same code in conventional sequential form to other apparatus in the system or to a telegraph line for distant communication, and it therefore follows that mechanism must be provided to receive the code combinations in either or both forms, simultaneous and sequential.

The structure disclosed in parent application Serial No. 628,110, now U. S. Patent No. 2,982,810, issued May 2, 1961, includes keyboard transmitting equipment that can transmit the units of a code in sequential arrangement and simultaneous arrangement. Both forms of transmission can be sent at the same time or either form can be sent independently to the exclusion of the other by appropriate positioning of a switching control system. The invention of the present application includes a translating mechanism capable of receiving and translating either form of signals, sequential or simultaneous, which can be transmitted by the keyboard transmitter disclosed in the parent application or by two separate transmitters and is incorporated in a reperforator structure.

Accordingly, a primary object of this invention resides in the provision of a novel receiving mechanism adapted to the reception of either simultaneous or sequential forms of the Baudot or similar codes.

Still another object resides in providing a novel combination printer to receive either sequential or simultaneous code units. As a corollary to this object the novel printer can be embodied in a printing reperforator.

Another object resides in the provision of novel receiving mechanism which can translate incoming sequential code signals to simultaneous electrical conditions for simultaneous translation to mechanical operation such as printing or perforating or both.

Still other objects reside in the provision of new components in receiving structure enabling sequential code signals to be translated to simultaneous electrical conditions, thence by further translation to mechanical operating conditions, and these components include a novel sliding contact structure with a printed circuit board. Also included in these objects are contact structure locking mechanism and a control in the sequential receiving structure to start actuation of the simultaneous signal translating equipment.

Still another object resides in providing a novel receiving structure for receiving sequential or simultaneous code signals to be translated to a mechanical operation wherein when sequential signals are received, both sequential receiving mechanism and simultaneous receiving mechanism are operative to translate to a mechanical operation and when simultaneous signals are received, the sequential mechanism is not operative.

A still further object resides in providing a novel mechanism for receiving simultaneous incoming code signals and translating the electrical conditions to mechanical positions including a unitary solenoid structure with two-position plungers adapted to be simultaneously actuated to position mechanical selecting mechanism. In furtherance of this object the mechanical selecting mechanism includes a group of Y-levers independently positioned by the plungers, a transfer mechanism with a function shaft and a positive clutch with a solenoid control. The solenoid control is pulsed to permit engagement of the positive clutch immediately after the simultaneous signals are received to thereby transfer the mechanical position of the Y-levers and permit the next group of simultaneous signals to be received by the unitary solenoid structure.

Further novel features and other objects of this invention will become apparent from the following detailed description, discussion and the appended claims taken in conjunction with the accompanying drawings showing preferred structures and embodiments, in which:

Figure 8:
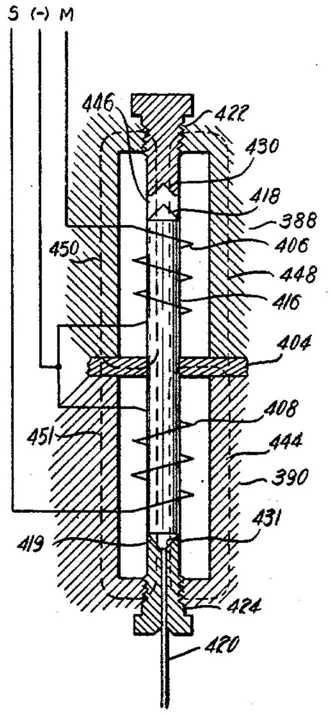
Figure 9:
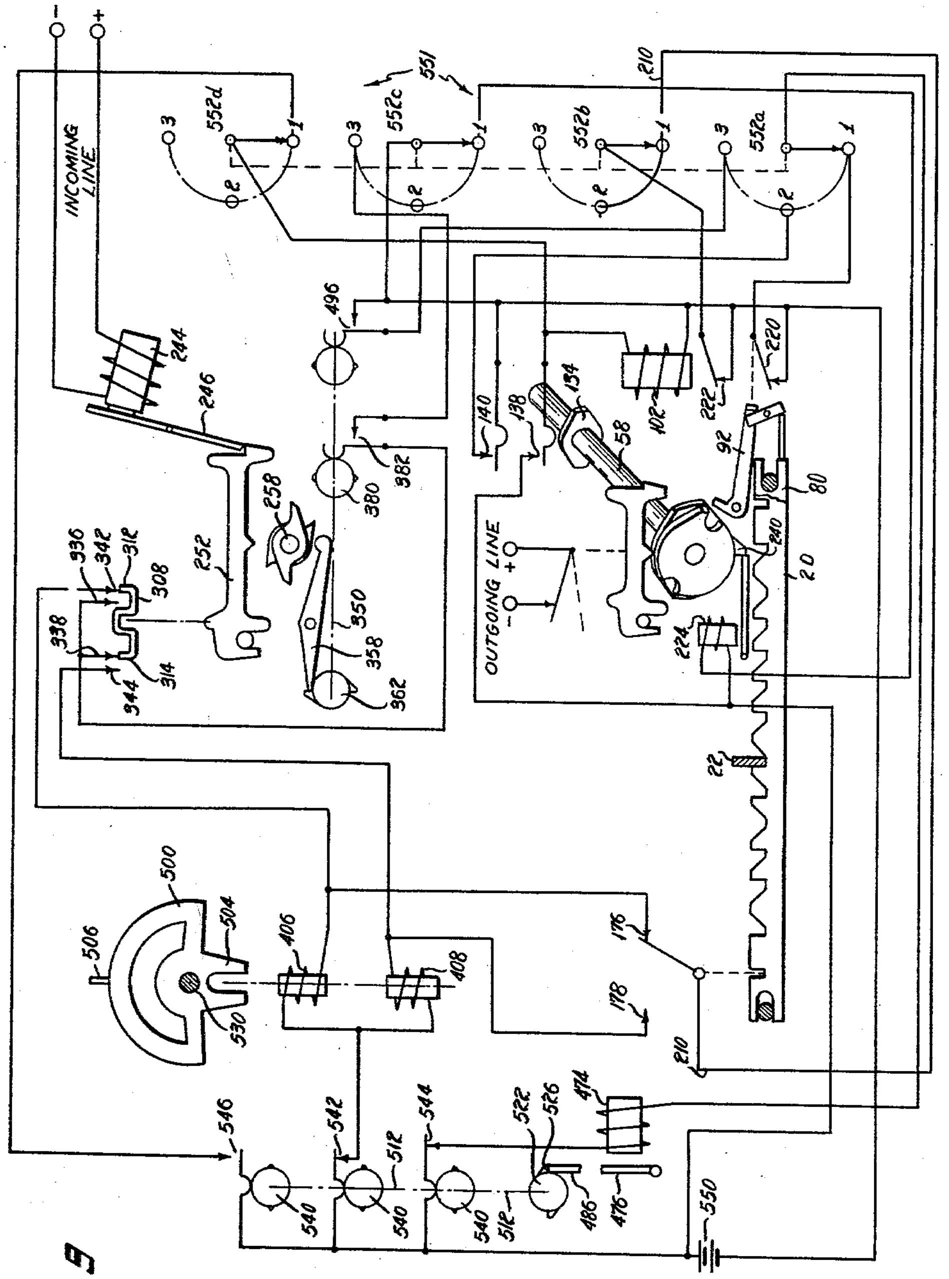

FIGURE 8 is a schematic vertical section through the unitary solenoid structure, illustrating the magnetic circuits of the simultaneous receiver and used in the description of the magnetic detent action for each plunger position; and FIGURE 9 is a diagram of suitable interconnecting circuits of the keyboard transmitter and reperforator of this invention, enabling switching control to change systems of transmission and reception.

GENERAL DESCRIPTION

The equipment embodied in this receiving invention will be described generally in connection with a telegraph keyboard basically similar to that disclosed in E. E. Kleinschmidt et al. Patent No. 2,773,931 for Printing Telegraph Apparatus, with a keyboard operated sequential code unit transmitter substantially similar to that disclosed in the E. F. Kleinschmidt et al. U.S. Patent No. 2,754,364. As disclosed in the aforementioned patents, pressing of a key moves five permutation bars to left and right hand positions indicative of "space" (no-current) and "mark" (current) conditions of the code. A sixth bar is invariably moved to the right by the pressing of a key and is instrumental in releasing a transmitter camshaft to make one-half revolution. As the camshaft revolves, six cam lobes are presented in sequential order to six cam followers and the cam followers are conditioned by the permutated positions of the code bars to allow one or the other of their ends to be raised by the passage of the associated cam lobs. This selective raising of one or the other ends of a follower causes an electrical contact to be closed or opened to provide a sequence of timed current or no-current electrical conditions to be transmitted over a single wire line. Seven of these pulses make up a code signal for each of thirty-two different combinations; the first pulse is always one of no-current, the succeeding five pulses are permutatively selective and the seventh pulse is invariably a current pulse. After the camshaft has made one half revolution, in which time the seven pulses are transmitted, it is stopped and will be ready for the next key to be depressed for transmission of the next code signal. The speed of the transmitter camshaft is synchronized with the receptive speed of the associated telegraph equipment and is normally in the order of sixty words per minute. Using a transmitter, as briefly described above, sequential signals may be sent out on the line and the message may be monitored on a local page printing machine such as the one disclosed in the above mentioned Patent No. 2,773,931.

For more economical use of line time and for smoother operation of the receiving equipment, it is advantageous to store the messages produced by the keyboard for future transmission. Message storage can be accomplished in various ways, e.g., holes punched in a paper strip or magnetic spots on a steel tape. In the present invention, storage of messages is performed by a perforator which prints a type character and punches code holes in the tape. The perforator has two coordinated receiving mechanisms, one of which is adapted to receive incoming sequential signals from a line and the other of which is adapted to receive simultaneous signals directly from a keyboard. The new keyboard transmitter disclosed and claimed in the aforementioned parent application includes basic keyboard structure of the aforementioned U.S. Patent No. 2,754,364, but the left side of the keyboard transmitter includes a simultaneous switch mechanism which is controlled by the movement of the code bars (see FIGURE 9). Each code bar will move a switch member to the left or right according to the code condition, then simultaneously completing a group of permutated "mark" or "space" connections to a solenoid structure at the perforator, which is adapted to these simultaneous circuits, will operate to translate the code to mechanical conditions and record it on the tape.

When the equipment is used for only simultaneous transmission and reception, the perforator may be operated at a speed greater than the normal typing speed so the typist may manipulate the keyboard in the same free manner as used in operating an electric typewriter. This feature constitutes quite an advantage particularly when the message is being stored for future transmission on a single line and especially for operators who are not used to the restricted speed of a conventional telegraph keyboard.

The coded tape, which contains the stored message, may be subsequently fed to a tape transmitter, a suitable transmitter being disclosed in the E. F. Kleinschmidt U.S. Patent No. 2,923,769, wherein the coded tape is read and sequential signals placed on the transmission line. These outgoing signals may be monitored by the local perforator through its sequential receiver or they may be monitored by a local page printer, in which case the perforator will be free to record incoming messages or to store further messages from the local keyboard.

The sequential receiver of the perforator includes the conventional single relay receiver with selecting levers, Y-levers and transfer T-levers similar to receiving structure shown in the above referred-to Patent No. 2,773,931. In this invention, the sequential receiver cooperates with associated mechanism to translate the incoming sequential pulses into simultaneous switch positions which in turn operate the simultaneous receiver of the perforator which has been briefly referred to. The receiver mechanism will now be described.

RECEIVING MECHANISM (REPERFORATOR)

The receiver of this particular embodiment (depicted in skeletonized perspective in FIGURE 5) is known in the art as a reperforator. It will receive a telegraph message from a wire and translate the electrical code signals into mechanical operations to type the message on a paper tape and at the same time record the code in the tape by means of punched holes. A reperforator of the nature referred to is disclosed in United States application Serial No. 472,076, filed November 30, 1954, now U.S. Patent No. 3,014,095, to which reference may be made for details of typewheel, printing and perforating mechanism not illustrated herein. In order to mechanically utilize the electrical form of the received code signals, the elements of the code must be converted into mechanical settings. U.S. Patent No. 2,754,361 discloses a selector for this purpose, components of which are employed as subcomponents in the specific receiver embodiment of this invention. A very brief description of the sequential selector of this device and its operation will now be given.

Figure 1:
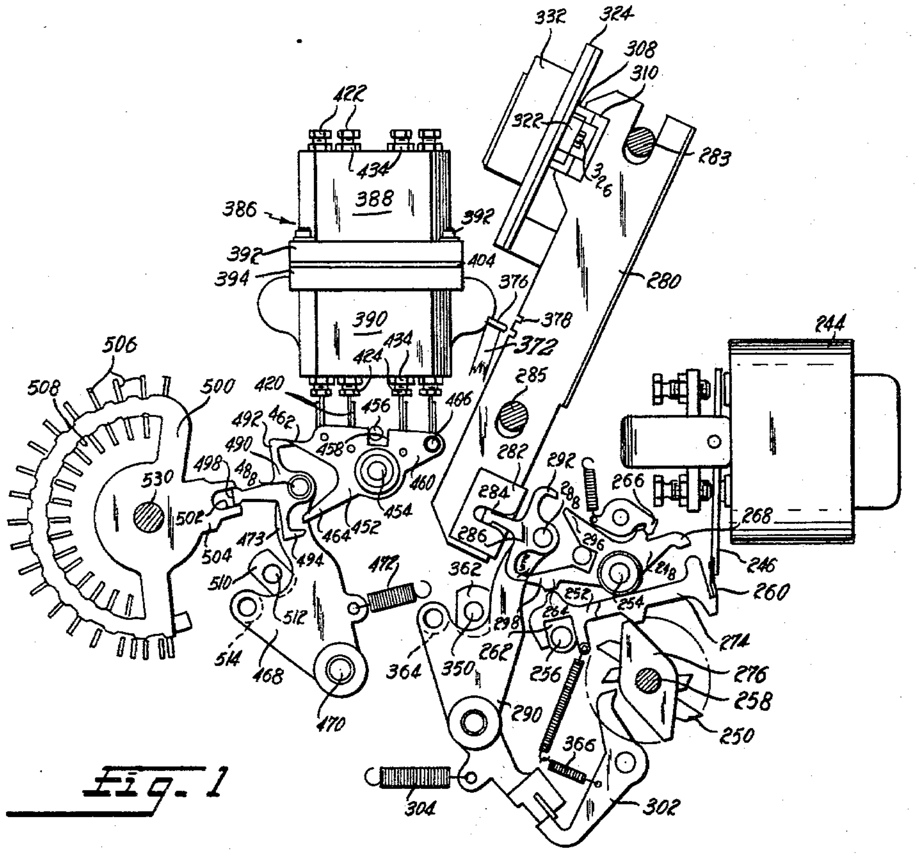
FIGURE 1 is an elevation view illustrating the various units of the sequential and simultaneous receiving and selecting mechanism of the printing reperforator of this invention.
Figure 5:
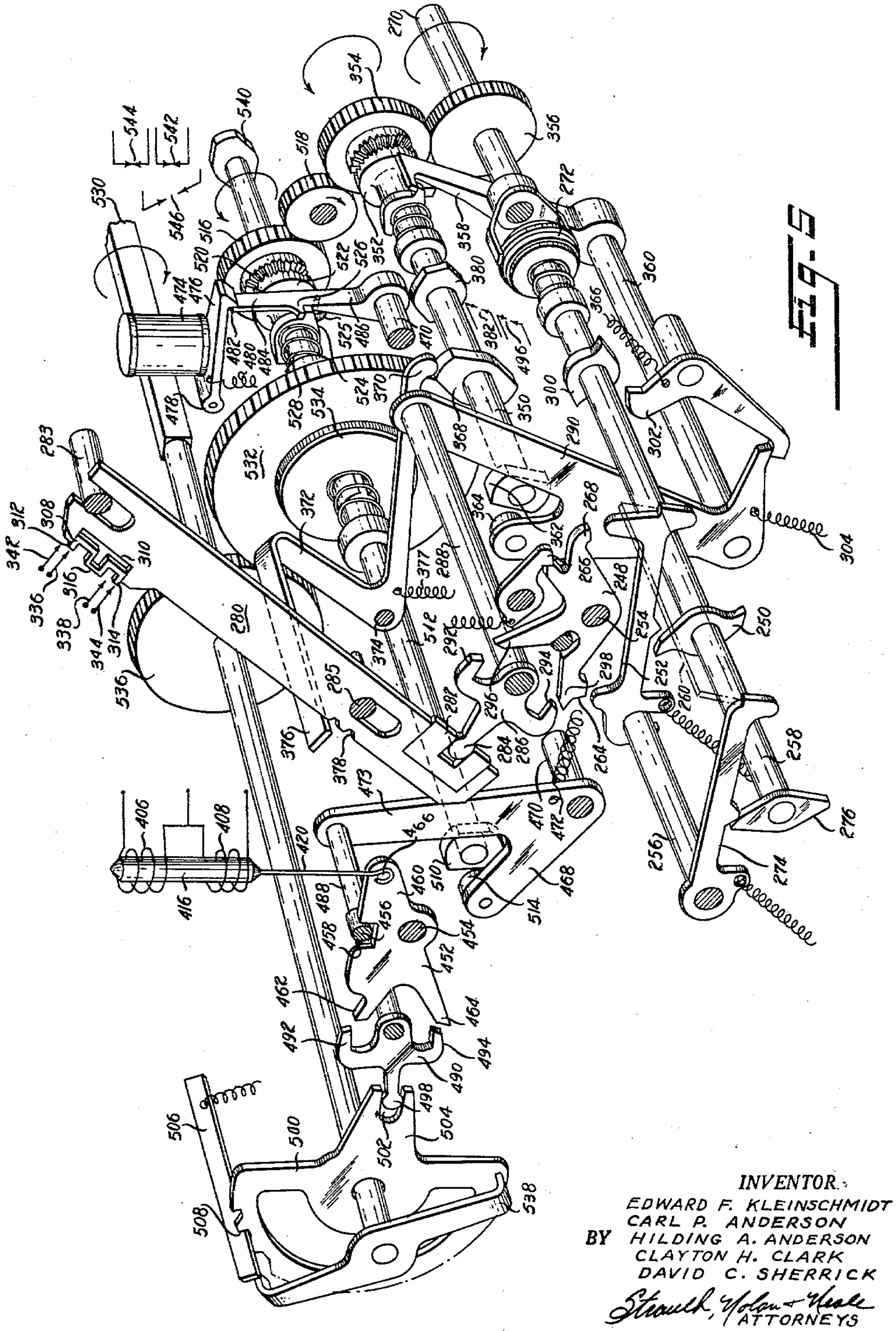
FIGURE 5 is a simplified perspective view of the operating components of the receiving and selecting mechanism.

All of the receiving selector mechanism, both sequential and simultaneous, is located at one side of the reperforator and the essential elements are shown in FIGURES 1 and 5. To receive sequential signals to be converted to mechanical settings, there is a selector magnet 244 with a movable armature 246. The winding of selector magnet 244 receives the sequential electrical pulses of the code combination and armature 246 is caused to move to one of two positions, depending on whether the impulse received is a marking or a spacing impulse. Each of the five electrical impulses that comprise any code combination group is recorded in the form of clockwise or counterclockwise movement of five corresponding Y-levers 248. This is accomplished through the use of five selector cam lobes 250 operating in conjunction with five selector levers 252 and the armature 246. The five Y-levers 248 are mounted on a common pivot stud 254, the five selector levers 252 are mounted on a pivot stud 256 and the five selector cam lobes 250 are mounted in axially spaced relation on a rotatable camshaft 258 with the cam lobes projecting at progressively offset angles from the camshaft 258. One selector cam lobe 250 operates in conjunction with only one associated selector lever 252 and that lever with only one associated Y-lever 248. Thus there are five planes, one in back of the other, each containing a set of these three parts. The end 260 of the selector magnet armature 246 is broad enough to engage all five selector levers. Each of these five sets of parts records one of the impulses of the five unit code. The first set records the first impulse, the second set the second impulse, etc.

During the time a marking impulse is received, the selector magnet armature blade 260 is moved into the path of a selector lever 252. Near the middle of this time period, the selector cam lobe 250 corresponding to the impulse being received will be rotating, will engage and raise the selector lever 252. As the armature blade 260, being positioned in the path of a selector lever 252, prevents raising of the right end of the selector lever, the selector lever is forced to rise at its left end by sliding on the bearing shoe 262. In so doing, the selector lever 252 pushes against the Y-lever 248 at its end 264, turning the Y-lever clockwise (unless it is already in that position). Further rotation of the selector camshaft 258 permits the selector lever 252 to drop back, but the Y-lever 248 is held in the clockwise position by a detent 266. A marking impulse is thus recorded in the form of the clockwise position of a Y-lever.

During the time a spacing impulse is received, the selector magnet armature blade 260 is moved away from the selector levers 252. Near the middle of this time period, the rotating selector cam lobe 250 corresponding to the impulse being received will engage and raise the corresponding selector lever 252. The end 260 of the armature does not obstruct the right-hand end of the selector lever 252, therefore the right-hand end is free to rise. In rising, the right-hand end of the selector lever 252 pushes up against the end 268 of the Y-lever 248, turning the Y-lever counterclockwise (unless it is already in that position). A spacing impulse is thus recorded in the form of the counterclockwise position of a Y-lever. The Y-lever detent 266 also holds the Y-lever in the space position.

To synchronize the selector cam lobes 250 with the incoming electrical impulses, cam lobes 250 are set into motion from a stopped position at the start of each code group and stopped at the end of each code group. The selector camshaft 258 is driven by a drive shaft 270 through a friction clutch 272. Normally when no messages are being received, current flows in the windings of the selector magnet 244 and the camshaft 258 is prevented from turning by the interoperation of the selector magnet armature blade end 260, stop lever 274, and a camshaft stop plate 276. When moved to the left, the armature blade end 260 engages the stop lever 274 which in turn prevents the stop plate 276 and selector camshaft 258 from turning. When the start (no-current) impulse for a code group is received, the armature end 260 is moved to disengage the stop lever 274, releasing it and the stop plate 276; the selector camshaft 258 immediately starts to rotate, bringing the first selector cam lobe 250 into engagement with its selector lever 252 by the time the next impulse of the code group (first bit) is received.

Thereafter, each of the remaining five selector cam lobes strikes its respective selector lever when the corresponding code bit is being received. All five cam lobes operate their selector levers within one half revolution of the camshaft. The camshaft is limited to making only one half revolution per code group because, after the last five bit impulses are received, the stop impulse moves the magnet armature 246 to the left to engage the stop lever 274. The other end of the stop plate 276, which then comes around, engages and is held by the stop lever 274 to stop the camshaft 258. If further details of the sequential receiving structure is desired, reference is made to U.S. Patent No. 2,754,361.

TRANSFER FROM SEQUENTIAL TO SIMULTANEOUS

Figures 2, 3:
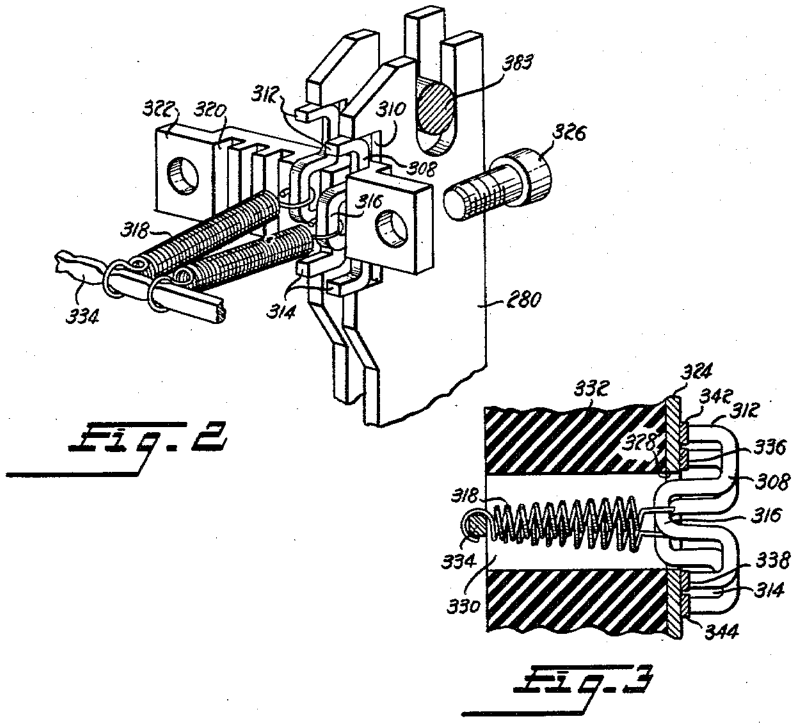
FIGURE 2 is a detail perspective view of the contact structure and part of the code plates used in the sequential and simultaneous receiving mechanism.
FIGURE 3 is a detail section view of the contact wipers used with the contact structure shown in FIGURE 2.

Referring to FIGURES 1, 2 and 5, the receiver mechanism has five dielectric code plates 280 of a code actuated switch which must be positioned according to the incoming sequential code group in order to convert the sequential form of the code group to a simultaneous form to be received by five solenoids for subsequent conversion to printed and punched tape. The incoming code group as stored in the Y-levers 248, by clockwise and counterclockwise settings, is transferred to the dielectric code plates 280 by mechanism to be now described.

Each code plate 280, at its lower end, carries a slotted metallic shoe 282 which mates with a corresponding tail 284 of one of five T-levers 286, all of which are mounted on a common pivot 288 carried on the end of a transfer lever 290. The five code plates 280 are mounted for reciprocation on two fixed posts 283 and 285 which pass through appropriate slots in the code plates. Turning a T-lever 286 on its pivot will cause its mating code plate 280 to move up or down. The T-levers are mounted in the same planes as their corresponding Y-levers, and movement of the transfer lever 290 engages certain ones of the ends of the T-levers 286 with certain ones of the ends of the Y-levers 248. The ends 292 and 294 of the arms of T-levers 286 are spaced farther apart than associated ends 296 and 298 of Y-levers 248. Therefore, only one end of the T-lever can engage one end of a Y-lever at any time and the ends which engage will depend upon Y-lever position. When the transfer operation takes place, the transfer lever 290 moves all of the T-levers against the Y-levers and the T-levers assume positions corresponding to associated Y-levers, thus transferring the five stored code settings of the Y-levers to the T-levers and thence to the code plates 280.

The transfer operation, a reciprocatory swinging movement of the transfer lever 290, takes place after the fifth code bit is stored in the Y-levers but before the selector camshaft 258 is brought to rest by the stop signal. A sixth or transfer lever latch tripping cam 300, FIGURE 5, mounted on the selector camshaft 258, trips a transfer lever trip latch 302 which holds transfer lever 290 in a left-hand position, and the transfer lever 290 is pulled clockwise by the transfer lever spring 304. The timing of the latch tripping cam 300, with respect to the five selector cams 250 and stop plate 274, is such that the tripping action takes place only after the Y-lever selecting operation is completed and before the selector camshaft 258 is stopped.

Each of the five code plates 280 is associated with one of five contact wipers 308, each of which is disposed in a cut-out 310 in the upper end of one code plate. With reference to FIGURES 2 and 3 for details, these contact wipers 308 are square in cross section and are bent in the shape of a W with the two ends 312 and 314 forming the wipers and the middle U-section 316 forming an anchor clip for a biasing spring 318. Each wiper 308 (FIGURE 2) slides within slot 320 of a guide block 322, one slot being provided for each wiper. Guide block 322 is fastened to a switch plate 324 by screws 326. The width of block 322 (FIGURE 2) is narrower than the cut-outs 310 in the ends of code plates 280 to permit unobstructed movement of the code plates when they slide into 'mark" and "space" positions. Biasing springs 318, one for each wiper 308, pass through an opening 328 in switch plate 324, through a hole 330 in a backing block 332 and are attached to an anchor bar 334 located at the rear of the hole 330.

Figure 4:
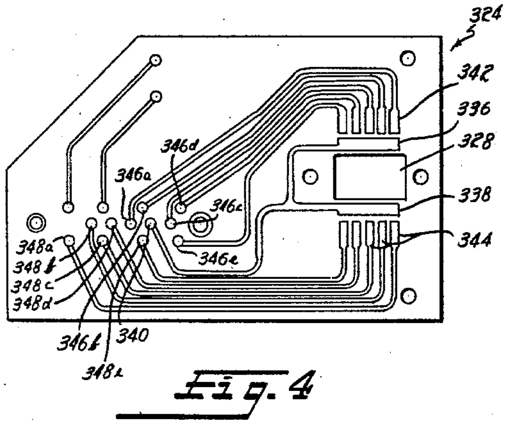
FIGURE 4 is a plan view of the receiving mechanism printed circuit plate used with the contact structure of FIGURE 2.

The printed circuit switch plate 324, FIGURE 4, has two contact strips 336 and 338, disposed adjacent opposite side edges of opening 328, which provide the common contacts of the simultaneous circuit. These common contact strips 336 and 338 are connected and terminate at a pin 340. The arm 312 of the wiper 308 is associated with the common strip 336 and the arm 314 is associated with the common strip 338 and one or the other of the wiper arms 312, 314 always rests on one or the other of the common strips when the wiper 308 is in spacing or marking position. The printed switch plate 324 also provides two more contacts for each contact wiper, one (342) above the strips 336 and one (344) below the strip 338. Each of these contacts 34p and 344 has printed circuits which terminate at pins 346*a*, *b*, *c*, *d* and *e*, and 348*a*, *b*, *c*, *d* and *e*. Thus, when a code plate 280 is in the upper position (spacing), the lower arm 314 of the wiper 308 rides against the lower common contact strip 338 while the upper arm 312 rides against its associated contact 342, closing one circuit to the simultaneous selecting mechanism. In this manner, each code plate 280 closes one circuit if the impulse it represents is a marking impulse, or closes a different circuit if the impulse it represents is a spacing impulse.

A code actuated switch function shaft 350, FIGURES 1 and 5, performs three main functions: (1) it restores the transfer lever 290 and associated mechanism to its latched position; (2) it provides power to register and lock the code plates 280 in place, and (3) it controls a switch which energizes the circuits of the simultaneous receiving mechanism, to be later described.

Function shaft 350 is driven in a counterclockwise direction through a toothed clutch 352 at the right-hand end of the shaft. Shown in FIGURE 5, a spur gear 354, carrying one part of clutch 352, is in constant rotation through its engagement with a driving gear 356 on the power shaft 270. The clutch 352 is engaged when the transfer operation takes place and is accomplished by the clockwise turning of clutch latch 358 which, through a shaft 360, is connected to the transfer lever 290 and is rotated when the transfer lever latch 302 is actuated to release the transfer lever. Turning of clutch latch 358 permits the clutch members to spring together and function shaft 350 starts to rotate. The T-levers 286 must be moved away from the Y-levers before the next code group can be set up in the Y-levers and this action is accomplished when the transfer lever 290 is restored to the latched position. The transfer lever 290 must be rotated slightly counterclockwise against the tension of the spring 304 and latched in this position by the transfer lever latch 302. A cam 362 at the left-hand end of the function shaft 350 operating on a roller 364, mounted on an extension arm of transfer lever 290, accomplishes this restoring action during a one-half revolution of the shaft 350 by camming the transfer lever 290 toward the restored position. Near the end of the one-half revolution, as the transfer lever moves into restored position, the transfer lever latch spring 366 pulls the transfer lever latch 302 into position to latch the transfer lever.

After the five code bits have been received by the sequential receiver, and the associated selector mechanism has caused the positioning of the five code plates 280, the plates 280 are registered and locked in place to align the contact wipers 308 in their exact correct selected positions. As illustrated in FIGURE 5, this function is performed by the interoperation of a cam 368 on the function shaft 350, a cam follower 370 on an extension of a registering lever 372, pivoted at 374, and having a registering bail 376 on a second extension. Registering lever 372 is biased clockwise by a spring 377. While the selection and transfer operations are taking place, the cam follower 370 rests on the high portion of the cam 368. The function shaft 350 is stationary during this time so the cam 368 is not rotating. When function shaft 350 is coupled to the drive gear 354 through clutch 352 so shaft 350 starts to rotate, the cam follower 370 drops off the high portion of the cam 368 and the bail 376 moves up against notches 378 of the plates 280. The notches 378 are aligned with the upper notches of the mark positioned code plates in line with the lower notches of the space positioned code plates, so that the five notches are simultaneously engaged by the bail 376 of the lever 372. The notches 378 are V-shaped and the bail 376 has a knife edge, hence slightly out-of-line code plates are cammed into place as the register bail 376 engages the notches.

To prevent arcing at the contacts of switch plate 324 when wipers 308 slide into their selected positions, the electric circuit to the common input of plate 324, which is received at the pin 340, is held in open condition. After the bail 376 positions and locks the plates 280, the simultaneous circuit is pulsed. A cam 380 (see FIGURE 5) on the function shaft 350 is associated with a pair of contacts 382 in series with the energizing circuit to the simultaneous receiving mechanism, and when the lobe of cam 380 strikes the contacts 382 they will be closed to pulse the simultaneous code plate circuit.

SIMULTANEOUS RECEIVER

Five solenoids arranged in a unitary assembly are employed to operate the simultaneous receiving mechanism of this invention and by this arrangement a set of five Y-levers are positioned simultaneously instead of sequentially as in the above described sequential receiver. The solenoid construction, per se, constitutes a separate invention divided from the aforenoted parent application as a result of a restriction requirement and forms the subject matter of a separate co-pending application. Being an operating subcomponent of the present receiver mechanism, it will be herein described in detail.

Figure 6:
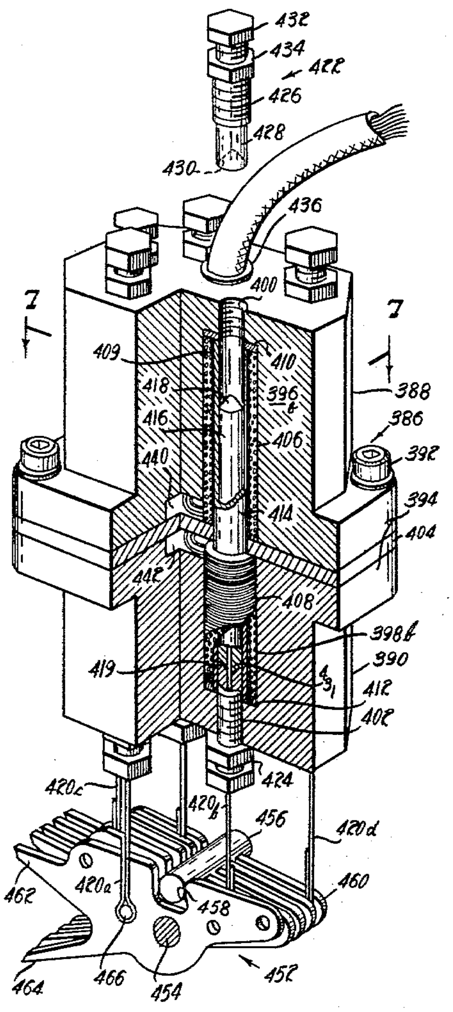
FIGURE 6 is a perspective view, partially cut away, illustrating the unitary solenoid structure and Y-levers of the simultaneous receiver.
Figure 7:
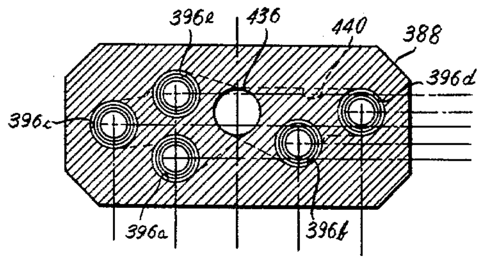
FIGURE 7 is a section view through the solenoid upper block taken on line 7—7 of FIGURE 6 and illustrates the position relationship of the solenoid plunger bores and the central bore for the lead-in wires to the solenoid coils.

Having general references to FIGURES 1 and 5 and specific reference to FIGURE 6, an iron housing 386 contains the solenoids. Housing 386 is an assembly of two blocks, an upper block 388 and a lower block 390, fastened together by screws 392 through flanges 394 on the two blocks. Each of the blocks 388 and 390 has five vertical chambers 396*a*, *b*, *c*, *d* and *e*, in the upper block, and 398*a*, *b*, *c*, *d* and *e* in the lower block, to receive solenoid coils 406 (upper) and 408 (lower). The corresponding upper and lower chambers 396 and 398 are aligned and arrayed in the manner illustrated in FIGURE 7 wherein the vertical axes of the chambers 396, 398 are spaced apart, from front to back, a distance equal to the spacing of a group of setting elements 452 (Y-levers) which are disposed directly below the solenoid housing 386. The spacing of the axes of the chambers 396, 398 in the other direction places two of them, the axes of chambers 396*b* and 396*d*, on the right of the center line of the housing 388 and three of them, the axes of chambers 396*a*, 396*c* and 396*e*, on the left of the center line. Upper and lower chambers 396 and 398 are bored from the abutting ends of the blocks 388 and 390 and terminate a short distance from the outside ends of the blocks. Smaller coaxial threaded holes 400 and 402 (FIGURE 6) connect the ends of the respective chambers 396 and 398 to the outside ends of the housing 388.

Sandwiched and clamped between the two blocks 388 and 390 is an iron or mild steel plate 404 with holes drilled in it to align with the associated chambers 396, 398 of the housing 386. These holes are slightly smaller in diameter than the chambers 396, 398, providing a slight shoulder at the inner end of each chamber portion 396 and 398, for a reason which will presently become apparent.

The assembled receiver solenoid unit contains the following elements within each chamber as illustrated by the cross-sectional view of the one chamber seen in FIGURE 6. The two solenoid coils 406 and 408, wound on sleeve cores 409, made of insulating material, are held snugly between the ends of the respective upper and lower portions 396 and 398 of each solenoid chamber and the aforementioned shoulder, provided by the mid-plate 404, by spring washers 410 and 412. Passing through the sleeve cores 409 of the coils 406 and 408 and through the associated hole in the mid-plate 404 is a non-ferrous metallic sleeve 414 within which an iron or mild steel plunger 416 is disposed with a freely slidable fit. Each plunger 416 has conical ends 418 and 419 and its lower end 419 has an axial bore within which the end of a wire 420 is press fitted. Plungers 416 are free to independently move up and down within the cylinders 414 and are limited in their travel by steel end plugs 422 and 424. Plugs 422 and 424 are identical except for a bore through the axis of each of the lower plugs 424 through which the aforementioned wires 420 project. Each of plugs 422 and 424 have a threaded portion 426 to mate with the threaded holes 400 and 402 at the end of the upper and lower cylinders, and a smaller inner cylindrical end 428. The inner ends 428 of upper plugs 422 have conical recesses 430 to mate with the conical plunger tips 418 and the ends 428 of lower plugs 424, a frusto-conical recess 431 to mate with the lower tips 419 of plungers 416. Each plug 422 and 424 has an outer hexagonal head 432 for tool engagement, and each has a lock nut 434 threaded on its threaded portion 426. Plugs 422 and 424 are turned into the holes 400 and 402 a distance which will allow between 1/32 inch to 1/16 inch longitudinal movement of the associated plungers 416 within cylinders 414. The reason for variations in plunger movement will be later described. When the proper amount of movement of each plunger has been set, the lock nuts 434 are turned down against the housing 386 to secure the plugs.

Centrally located in upper block 388 is a longitudinal through bore 436 aligned with a centrally located hole (not shown) in the plate 404. Channels 440 and 442 (FIGURE 6) in the inside faces of the blocks 388 and 390 (also shown dotted in FIGURE 7) connect each solenoid chamber with the central bore 436. In the assembled solenoid block these channels provide passages to enable the wires from the ten solenoid coils 406 and 408 to be led through the central bore 436 to outside connections.

Magnetic detent of the solenoid plungers will be described with reference to a schematic magnetic circuit of the above described solenoid group shown in FIGURE 8. The plunger 416 is illustrated in its lower position which is the "space" position for this particular solenoid. The lower convex conical tip 419 of the plunger is held against the concave conical end 431 of the lower plug 424 due to magnetization of the steel plug 424. The polarization of this magnetized plug 424, as shown, is with the South pole at the top and is due to residual magnetism from a previous "space" pulse to the illustrated lower coil 408. The flux lines due to this permanent magnet (plug 424) are shown by the light dotted lines indicated by the numeral 444. As may be seen, most of this flux flows through the mid-plate 404 to complete the circuit, but some of the flux flows up the blocks 390, 388, through the top plug 422, across the air gap 446 and back down through the plunger 416. This latter flux is indicated by the numeral 448. As shown by this diagram, the plunger 416 will be permanently held against the lower plug 424. There is a slight attractive force between the upper tip 418 of the plunger 416 and the end 430 of the upper plug 422, but as there is a large air gap at the upper end, the attraction is relatively slight and can be ignored.

When the "mark" coil 406 at the top of the solenoid is pulsed, as was explained earlier, there is a magnetic flux circuit caused to flow as indicated by the heavy dotted lines 450 at the left side of the diagram. Due to the direction of the current pulse in this top coil 406, the upper tip 418 of the plunger 416 will become a North pole and the lower tip 419 will become a South pole. As the end 431 of the lower plug 424 is also a South pole, the two poles will repel one another to release the plunger 416 from the magnetic locking effect of bottom magnetized plug 424. At the same instant that the lower plug 424 releases the plunger, the magnetic field created by flow of current in the coil 406 causes the plunger 416 to tend to center itself in the upper coil 406 and it is snapped up into "mark" position with its upper tip 418 against the conical end 430 of the top plug 422.

The polarity of upper plug 422 is changed by the magnetic flux created by the current flowing in the top coil 406 and its conical end 430 thus becomes a South pole to attract and magnetically hold the plunger in this upper position. Due to the fact that the end plugs 422 and 424 are of highly magnetically retentive material, they are slower to respond to changes in polarity than is the magnetic flux circuit and always lag behind. When the current flows through the windings of the coil 406, the flux indicated at 450 causes the lower plunger tip 419 to become a South pole and also causes the end 431 of the bottom plug to become a North pole. However, the lag mentioned above enables the two parts 419 and 431 to be repelled before the end 431 of lower plug 424 has its polarity changed.

Thus there has been disclosed and described a solenoid plunger which may be driven one way or the other by alternately energized coils 406 and 408 and which will always be magnetically locked in its set position when the coils are de-energized.

Referring now to FIGURE 6, directly beneath the simultaneous solenoid receiver assembly described above, is a group of five Y-shaped levers 452 pivoted on a post 454 and having a slight turning motion one way or the other which is limited by a stop post 456 coacting with the sides of a slot 458 in each Y-lever. The stop post 456 is directly over the Y-levers pivot post 454 and the slots 458 are slightly wider than the diameter of the stop post 456. Clockwise rotation of a Y-lever is a result of a "mark" signal and counterclockwise rotation of a Y-lever is a result of a "space" signal. These five Y-levers 452 are somewhat similar in appearance to the five Y-levers 248 of the sequential receiver and serve the same purpose. Each Y-lever 452 has three arms, a right-hand arm 460 and two left-hand arms 462 and 464. Movement of the Y-levers 452 is effected through their attachment to associated ones of the solenoid plunger wires 420 projecting through the bottom of the simultaneous receiver housing 386. The front Y-lever has a wire *420a* attached to a post 466 at the left of the pivot 454 and is associated with the first element or bit of the Baudot code. The second Y-lever has the wire *420b* attached to a post at the right of the pivot and is associated with the second element of the code. The third Y-lever has the wire *420c* attached at the left of the pivot 454 and away from the pivot a distance double that of the first wire. The fourth Y-lever has the wire *420d* attached at the right of the pivot and away from the pivot a distance double that of the wire *420b*. The fifth Y-lever has its wire *420e* attached to the left of the pivot and directly behind the post 466 on the first Y-lever. The plungers associated with wires *420a*, *420c* and *420e* move down when their "mark" solenoids are pulsed and up when their "space" solenoids are pulsed. The plungers associated with wires *420b* and *420d* move up when their "mark" solenoids are pulsed and down when their "space" solenoids are pulsed.

With the described arrangement of the wire connections to the Y-levers, it is necessary that the solenoid plungers *416c* and *416d* within the solenoid receiver housing 386 move twice as far to set the third and fourth Y-levers as to set the first, second and fifth levers due to the greater distance of the wire attachment from the pivot 454. This difference in movement of the plungers 416 is adjusted by the screw plugs 422 and 424 as was previously explained. The forces necessary to turn the Y-levers are about equal regardless of the greater movement of two of the plungers due to the fact that the two that have to move the farthest are also farther from the pivot 454 so that a greater lever action is available for the turning of these latter two levers.

Referring now to FIGURE 5, the operations of the simultaneous receiving and translating mechanism subsequent to positioning of Y-levers 452 will now be described.

When the five "mark" or "space" circuits set up by code plates 280 are pulsed by the pulsing cam 380 on the function shaft 350, associated ones of the "mark" or "space" solenoids within the solenoid receiver housing 386 are energized and magnetically locked to simultaneously move and retain the five Y-levers 452 to desired clockwise or counterclockwise positions; clockwise for marking impulses and counterclockwise for spacing impulses. A second transfer lever 468, for transferring settings of Y-levers 452, is fixed on the end of a shaft 470 and, with shaft 470, can turn clockwise a slight amount under the biasing force of a spring 472. This transfer lever 468 is latched in cocked condition against the force of spring 472. Release of transfer lever 468 is accomplished by energizing an electromagnet 474 which attracts a latching armature 476 pivoted at 478 and biased away from the magnet 474 by a spring 480. The armature 476 has a latching end 482 which engages an end 484 of a latch lever 486 fixed to the second transfer lever shaft 470. When the magnet 474 is energized, the armature 476 pulls up and releases the latch lever 486 which in turn permits the transfer lever 468 at the outer end of the shaft 470 to turn under bias of spring 480.

Mounted on the end of an arm 473 of the second transfer lever 468 is a post 488 which pivotally mounts five T-levers 490, identical to the T-levers 286 previously described for the sequential receiver. When transfer lever 468 is released the T-levers 490 are moved forward against the simultaneously positioned Y-levers 452 and one or the other of the arms 492 or 494 of the T-levers 490 will strike one or the other of the arms 462 or 464 of the Y-levers 452 to turn the T-levers in clockwise or counterclockwise directions. Clockwise rotation of a T-lever is the result of a "space" signal and counterclockwise rotation is the result of a "mark" signal.

The "start" or latch electromagnet 474, which releases the second transfer lever 468 as described above, is controlled through contacts 496 (when a control switch 551, later described, is in position 3) by the cam 380 on the function shaft 350. Contacts 496, associated with cam 380, are closed at approximately the same time as the aforementioned contacts 382 are closed to pulse the solenoids in the simultaneous receiver. Contacts 496 are in series with the latch electromagnet 474, therefore, at the same time the solenoids within the simultaneous receiver are energized to effect the setting of the simultaneous Y-levers 452, the electromagnet 474 is energized to release the transfer lever 468. Electromagnet 474 is made to respond more slowly than the solenoids so the Y-levers will always be completely set before the T-levers 490 strike them. This delay of the magnet 474 can be accomplished in any of a number of known ways, such as placing two switch actuating portions of cam 380 in slightly staggered relationship or using an electrical delay circuit, but it is to be understood that the Y-levers 452 must be completely set before the T-levers 490 are moved into engagement therewith.

Each T-lever 490 has a tip 498 which engages a notch 502 in an arm 504 of a code device, as for example, a permutation ring 500 shown in FIGURES 1, 5 and 9. There are five of these rings 500 and when they are rotated to clockwise and counterclockwise positions by the action of T-levers 490 turning in counterclockwise and clockwise directions, one of a plurality (32 in this embodiment) of stop bars 506 will be sprung into a channel of lined-up notches 508 in the five rings. Once one of the 32 stop bars 506 has been selected by dropping into the aligned notches 508, the T-levers 490 may be disengaged from the Y-levers 452 to free the latter for a new selection. The restoring of the T-levers 409 to a position out of engagement with the Y-levers is accomplished in a manner similar to that used in restoring of the T-levers 286 of the sequential selector. A cam 510 at the end of a second function shaft 512 cooperates with a roller 514 at the end of an arm on the transfer lever 468. When the transfer lever 468 is released, its pivotal movement swings roller 514 against the flat side of cam 510 and subsequent rotation of cam 510 causes the transfer lever 468 to be turned counterclockwise a distance far enough to permit the latch lever 486, at the opposite end of the transfer lever shaft 470, to become latched behind the latch end 482 of armature 476.

Rotation of the second function shaft 512 to effect the above described restoration of the transfer lever is accomplished as follows: At the right-hand end of the shaft 512, FIGURE 5, a rotatably mounted spur gear 516 is in mesh with and constantly rotated by an idler gear 518 which in turn is constantly rotated by the train of gears 354 and 356. On the left face of the rotatably mounted gear 516 is a toothed clutch driving element 520 normally out of engagement with a driven clutch element 522. The driven clutch element 522, non-rotatably keyed to and axially shiftable on function shaft 512, is held away from the driving element through the interoperation of a dog 524 rigid on the driven element, and a roller 525 and stop 526 on the aforementioned latch lever 486. The driven clutch element 522 is biased by a compression spring 528 toward the driving clutch element 520 and, when the transfer lever latch lever 486 is released by movement of the armature latch 482, the stop 526 on latch lever 486 moves to release the dog 524 on the sliding clutch element 522 which will axially shift under bias of spring 528 and become engaged with the driving clutch element 520 to cause shaft 512 to rotate counterclockwise.

After the shaft 512 has made one-half a revolution which, as described above, restores the latch arm 486 to its latched position, the dog 524 of the sliding clutch element 522 will strike the roller and stop 526 of latch arm 486, disengagement of the clutch will result and the shaft 512 will cease rotating.

A number of machine operations are performed as a result of rotation of the second function shaft 512 during its one-half revolution but the only purely mechanical one to be dealt with here is the positioning of a type selecting shaft 530. A large gear 532 is rotatably mounted on the shaft 512 and is caused to turn with the shaft by spring pressed friction plates 534, only one of which can be seen in FIGURE 5. The friction plates are keyed to the shaft 512 and always turn with it. In mesh with the gear 532 is a smaller gear 536 fixed to the type selecting shaft 530. At the left end of the type selecting shaft 530 is a stop arm 538, constructed to rotate inside of the stop bars 506 and to be arrested by any bar which is selected by dropping into aligned notches of the code rings 500.

It follows then that when the second function shaft 512 starts to rotate, the type selecting shaft 530 will also start to rotate and the latter shaft 530 will continue to rotate until stop arm 538 contacts a selected stop bar 506. The shaft 530 will then stop due to the slippage of the gear 532 on the faces of the friction clutch 534. The type selecting shaft 530 will thus have been rotated to an angular position which corresponds to a type character represented by the code received at the simultaneous receiver.

One other mechanical electrical operation performed by the second function shaft 512 is an important part of this invention. At the right-hand end of the function shaft 512 is a cam 540 which cooperates with two normally closed pairs of contacts 542 and 544, opening them at certain timed intervals, and with a pair of normally open contacts 546, closing them at timed intervals. The purpose of each of these pairs of contacts will be disclosed in the description of the overall electric circuit to be hereinafter completely described.

SWITCHING CIRCUIT

Although not part of the present invention, a switching circuit for interconnecting a system transmitting component with the receiving elements of this invention is shown in FIGURE 10 and will aid in showing the manner in which the present invention is used. At the right-hand side of the diagram is a three position switch 551 having four independent banks 552*a*, 552*b*, 552*c* and 552*d*. The three different positions of the switch, as illustrated, allow the following arrangements. It is obvious that additional combinations may be had by adding positions to the switch.

*Position 1*

Keyboard (simultaneous sending) to reperforator (simultaneous) receiver: This is the *free* keyboard condition of the system described in parent application Serial No. 628,110. The operator may manipulate the keyboard at any cadence or rhythm to print and punch tape on the reperforator.

*Position 2*

Keyboard (simultaneous sending) to reperforator (simultaneous) receiver—Keyboard (sequential sending) to outgoing line: The operator may work the keyboard to send a message by sequential sending to an outgoing line (which may be a monitoring page printer) and at the same time have the same message punched and printed on tape by the reperforator. The speed at which the keyboard may be operated is limited by the speed of the machines on the outgoing line.

*Position 3*

Keyboard (sequential sending) to outgoing line—Reperforator (sequential receiving) from incoming line: The operator may send a message from the keyboard to an outgoing line by sequential signals and at the same time an incoming message may be printed and punched on tape by the reperforator.

*Setting switch 551 in No. 1 position* enables the operator to manipulate the keyboard to send simultaneous signals to the reperforator which will print and punch tape. Referring now to FIGURE 10, sequential signals will not be sent because the sequential transmitter is prevented from operating by a lock solenoid 224. The reperforator will not respond to signals from the incoming line because the common circuit through switch plate contact strip 338 for the solenoids 406, 408, etc., is open at switch contacts 552*c* (3).

With the switch 551 set in No. 1 position, current from battery 550 will energize the coils of lock solenoid 224 at the keyboard through the switch contacts 552*c* (1) and thence back to the negative side of the battery. The keyboard transmitter shaft 58 is thus prevented from rotating so sequential signals will not be sent. Upon the pressing of a key lever 22, the keyboard code bars 20 will be set in left and right hand positions and the keyboard universal bar 80 moves to the right to release the keyboard transmitter stop lever 92 and to close the contacts 220 and 222. The contacts 222, when closed, will put battery current on the simultaneous receiving circuit as follows: from the positive side of battery 550 through the closed contacts 542 to the common side of the solenoid coils 406 and 408, through the coils and to a "space" contact 178 and "mark" contact 176 of the simultaneous switch at the keyboard; through the sliding switch arm 174 to the switch contact 552*b* (1) through the closed contacts 222 to the negative side of battery 550. Hence, certain "mark" and "space" solenoids in the simultaneous receiver will be energized and the Y-levers 452 will be set accordingly.

The closing of contacts 220, which also occurs when the keyboard transmitter stop lever 92 drops, will set up the circuit to release the reperforator transfer lever 468 and permit rotation of the reperforator's second function shaft 512. This circuit may be traced as follows: from battery 550 through closed contacts 544, through reperforator latch magnet 474 to switch contact 552*a* (1) through the contacts 220, to negative side of battery 550. Thus, the latch magnet 474 will be energized to pull on the armature latch 476 and release the second function shaft 512. As soon as the function shaft 512 starts to rotate, the cam 540 presents its lobe to the contacts 544 and 542 to open their circuits. Thus, the current is taken off the simultaneous receiver solenoids and off the start magnet 474 of function shaft 512.

The function shaft 512 continues to rotate to complete the selecting, printing and perforating of the desired character corresponding to the depressed keyboard lever 22. Shortly before the function shaft 512 is arrested by the latch lever 476, the lobe of the cam 540 closes the contacts 546 and a current pulse is delivered from battery 550 through the switch contact 552*d* (1), to the coils of a keyboard transmitter restoring solenoid 102 and to negative battery. Thus, the restoring solenoid in the keyboard transmitter is pulsed to pull stop lever 92 up into latching position and the contacts 222 and 220 are again opened.

Due to the fact that the receiving reperforator function shaft 512 cycles at a considerably higher speed than an operator can manipulate the keyboard, the transmitter cam stop lever 92 is always restored and in readiness to be released by the depressing of another key lever. The keyboard is thus practically unlimited in its speed of manipulation when the switch 551 is in this position No. 1.

*Setting switch 551 in No. 2 position* will permit the operator to work the keyboard to concurrently send sequential signals to the outgoing line and simultaneous signals to the reperforator. The sequential signalling transmitter shaft 58 is permitted to rotate because the lock solenoid 224 is not energized inasmuch as contacts 552*c* (2) are open.

When a key lever 22 is depressed, the code bars 20 take their left and right hand positions and the universal bar 80 releases the cam stop lever 92 to permit the keyboard transmitter shaft 58 to turn and close contacts 220 and 222. The closing of the contacts 222 will put current on the simultaneous receiving circuit just as before but in this second position the circuit is through switch contacts 552*b* (2). The start magnet 474 for the reperforator second function shaft 512 will be pulsed by current from battery 550 through contacts 544, through the coil of electromagnet 474 to the switch contacts 552*a* (2), through the contacts 140 closed by transmitter shaft cam 134 and to negative of battery. The simultaneous receiver then finishes its cycle just as before.

As this No. 2 switch position also sends the keyboard initiated message to the telegraph line, the sequential transmitter will cycle, having been released as stated above, to transmit the code group. Shortly after the sequential transmitter shaft 58 has started to rotate, restoring solenoid 102 will be energized from battery 550 through contacts 138, also closed by the transmitter shaft cam 134, through the solenoid coil 102 to negative battery. The cam stop lever 92 will thus be lifted to its stop position and the stop lever actuated contacts 222 will be opened. The transmitter shaft 58 completes its cycle and stops, awaiting another key lever to be depressed.

In the above described operation, the keyboard manipulating speed is under the control of the sequential transmitter speed due to the locking of the code bars by the keyboard sensing levers locking bail 150. This is obviously necessary when transmitting a message to a telegraph line which has a definite predetermined transmitting cadence.

*By setting the switch 551 in No. 3 position* the keyboard can send sequential signals to an outgoing line and the reperforator can receive sequential signals from an incoming line. The simultaneous sending circuit is ineffective because the circuit through common line 210 is open at contacts 552*b* (3). All other electrical circuits between the keyboard and the reperforator are open when the switch 551 is in No. 3 position. In this condition the keyboard transmits to the outgoing line in the same manner as in position 2.

The reperforator is in condition to receive sequential signals over the incoming line. The reception of a "start" signal will cause the selector magnet 244 to release the receiver shaft 258 which will rotate to position the sliding switches 308. The sliding switches 308 are set in "mark" and "space" positions on the switch plate 324 by the sequential receiving and selecting mechanism and are locked there. The cam 380 then closes contacts 382 which completes a circuit to connect battery 550 to the simultaneous receiving solenoids through the contacts 542 to the common lead to the solenoids, through the coils 406 or 408, to the mark segment 342 and to the space segment 344 of the code bar switching plate 324. For the mark position shown, the circuit proceeds through the contact 308 to the common segment 338, through the contacts 382, to switch contacts 552*c* (3), to negative battery. The simultaneous receiver 386 is thus energized to set the Y-levers 452.

Cam 380 also closes contacts 496 to place the battery 550 in circuit with the start magnet 474, which circuit is through contacts 544, through the coil of start magnet 474, to switch contacts 552*a* (3), through contacts 496 and to negative battery. Thus, the simultaneous receiver shaft 512 is released, the transfer of the Y-lever settings to the code rings 500 takes place and a printing cycle is completed to record the character identified with the incoming signal.

In the foregoing description and drawings, new printing telegraph equipment has been disclosed which will enable greater vesrsatility between keyboard transmitter units and receiver mechanisms than has heretofore been obtained. The receiving mechanism can receive code signal combinations in either sequential or simultaneous form and includes a sequential receiver and translator and a simultaneous receiver and translator, the two receivers and translators working in series when receiving sequential signals and only the simultaneous receiver and translator being operative when simultaneous code signal combinations are received. Many combinations of transmitting and receiving equipment can be realized with this new equipment in addition to use of standard page printers for monitoring keyboard transmission or receiving incoming messages and perforated tape transmitters for transmission of stored messages. A disclosed switching system illustrates various arrangements of the sequential-simultaneous keyboard transmitter used with a reperforator embodying the sequential and simultaneous receiver and a standard monitor which may be used with the keyboard. Although the keyboard transmitter operational speed is always limited by the standard line operational cadence, e.g., 60 words per minute, whenever sequential transmission is being accomplished, one arrangement, which uses only simultaneous transmission from a keyboard to the simultaneous portion of the reperforator, bypasses the cadence control required in sequential transmission, resulting in an essentially free keyboard for unlimited speed within the range of a human operator.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Signal data communication equipment comprising: receiving-translating mechanism including first means for receiving sequential forms of electrical code signal combinations and second means for receiving simultaneous forms of electrical code signal combinations; with means connecting to both of said first and second means selectively enabling reception of sequential and simultaneous signals.

2. Signal data equipment as defined in claim 1 wherein, said receiving-translating mechanism includes a sequential receiver translator and a simultaneous receiver translator, and said connecting means enables a series connection between said sequential receiver translator and said simultaneous receiver providing transfer of sequentially received and translated code signal combinations to said simultaneous receiver translator for further translation to mechanical operations.

3. A signal data receiving mechanism comprising: a power driven shaft; a cam shaft; a first function shaft; a second function shaft; a selecting shaft; a first friction clutch means connecting said power driven shaft to said cam shaft; a first positive clutch means adapted to connect said power driven shaft to said first function shaft; a second positive action clutch means adapted to connect said power driven shaft to said second function shaft; a second friction clutch means connecting said second function shaft to said selecting shaft; a single relay sequential receiving translator means cooperating with said cam shaft for receiving sequential electrical code signal combinations and translating said code signal combinations to mechanical settings, including a transfer mechanism and storage means with code switch devices positioned by said transfer mechanism; means controlled by said cam shaft to initiate action of said transfer mechanism for transferring said mechanical settings to said code switch devices and enabling engagement of said first positive clutch to rotate said first function shaft; means on said first function shaft to reset said transfer mechanism; means operated by rotation of said first function shaft for simultaneously energizing circuits to all of said positioned code switch devices; a unitary two position multi-solenoid plunger device having means for permutatively positioning said plungers operatively connected with said code switch means and simultaneously energized upon energization of said code switch devices; a plurality of selecting devices having two positions and permutatively positioned in accordance with said solenoid plunger positions; a second transfer means, in operative connection with a plurality of code devices, adapted to be moved from a latched position into engagement with said selecting devices to thereby permutatively position said code devices; means actuated immediately after simultaneous energization of said solenoid device for enabling engagement of said second positive clutch means to rotate said second function shaft and to release said second transfer means from latched position; means rendered operative upon rotation of said second function shaft to reset said second transfer means in latched position; means controlled by said code devices for positioning said selecting shaft at an angular position in accord with the character of the incoming code signal combination; and means operated upon completion of the cycle of rotation of both of said function shafts to respectively disengage their associated positive clutch means.

4. In the receiving mechanism as defined in claim 3, a control switching system interrelating said multi-solenoid device and said sequential receiving translator means for enabling said multi-solenoid device to be adapted for reception of externally transmitted simultaneous signals directly.

5. In the receiving mechanism as defined in claim 4, means are included in said control switching system to render said sequential receiving translator means ineffective whenever external simultaneous code signals are being received.

6. A signal data receiving selector mechanism comprising: a power driven shaft; a positive action clutch means; a function shaft; a selecting shaft; a friction driven clutch means drive connecting said function shaft and said selecting shaft; a plurality of selecting devices adapted to be positioned in accord with received code signal combinations; a transfer mechanism having a plurality of two position members corresponding to said selecting devices; a plurality of code devices interconnected with said two position members; means positioned by permutative positioning of said code devices for blocking rotation of said selecting shaft at specific predetermined angular positions; means maintaining said positive action clutch means in disengaged position and maintaining said transfer mechanism with said two position members out of contact with said selecting devices; a simultaneous electrical code receiving multi-solenoid unit having a plurality of solenoid plungers corresponding in number to said selecting devices and connected therewith to position said selecting devices in accordance with a group of incoming simultaneous code signals; means for releasing said positive clutch and transfer mechanism maintaining means immediately after reception of said simultaneous group of code signals whereby the position of said selecting devices is transferred to said code devices and said function shaft starts rotation; and means on said function shaft for resetting said transfer mechanism and disengaging said positive clutch means at the end of one cycle of function shaft operation.

7. A signal data receiving mechanism comprising: a power driven shaft; a function shaft; a selecting shaft; a positive clutch means adapted to connect said power driven shaft to said function shaft; a friction clutch means connecting said function shaft to said selecting shaft; a single relay sequential receiving translator for receiving sequential code signal combinations and translating said code combinations to mechanical settings, including storage means with code switch devices; means for simultaneously closing a circuit to all of said code switch devices; a unitary two position multi-solenoid plunger device having means for permutatively positioning the plungers operatively connected with said code switch devices and simultaneously energized upon closure of the circuit to said code switch devices; a plurality of selecting devices having two positions and permutatively positioned in accordance with said solenoid plunger positions; a plurality of code devices; a transfer means in operative connection with said plurality of code devices adapted to be moved into engagement with said selecting devices and thereby position said code devices; means actuated immediately after simultaneous energization of said solenoid unit for enabling engagement of said positive clutch means to rotate said function shaft and to release said transfer means, rotation of said function shaft immediately resetting said second transfer device and rotating said selecting shaft; means controlled by said code devices for positioning said selecting shaft at an angular position in accord with the character of the incoming signal combination; and means operated upon completion of the cycle of rotation of said function shaft to disengage said positive clutch means.

8. In the receiving mechanism as defined in claim 7, a control switching system whereby said multi-solenoid device can be adapted for reception of simultaneous signals directly; and means are included in said control switching system to render said sequential receiving translator ineffective.

9. A signal data receiving selector mechanism comprising: a plurality of selecting devices adapted to be positioned in accordance with received signal combinations; a transfer mechanism having a plurality of two position members corresponding to said selecting devices; a plurality of code devices interconnected with said two position members; means positioned by permutative positioning of said code devices adapted to block rotation of a type and function selecting shaft at specific predetermined angular positions; means maintaining said transfer mechanism out of contact with said selecting devices; a simultaneous electrical code receiving solenoid device having a plurality of solenoid plungers corresponding in number to said selecting devices and connected therewith to position said selecting devices in accordance with a group of incoming simultaneous code signals; means for releasing said transfer mechanism maintaining means immediately after reception of said simultaneous group of code signals whereby the position of said selecting devices is transferred to said code devices; and means for resetting said transfer mechanism.

10. A printing signal data receiver comprising: means for receiving and translating sequential units of a code signal combination; means for receiving simultaneous units of a code signal combination; means controlled by said simultaneous code signal receiving means enabling selection and operation of a mechanical printing mechanism in accordance with said received signal; means providing series operation of said sequential receiving and translating means and said simultaneous receiving means upon receipt of sequential code signal combinations; and selectively operable means rendering said sequential receiving and translating means ineffective whenever incoming signals are simultaneous signals of code signal combinations.

11. Signal data communication equipment comprising: receiving translating mechanism including means for receiving sequential forms of code signal combinations and translating each said combination to a simultaneous form of code signal combination, and means for receiving simultaneous forms of code signal combinations and translating them into mechanical operation; selective means, operatively connecting said sequential receiving means and said simultaneous receiving means to enable said simultaneous receiving means to receive code signal combinations independently from either the said means for receiving sequential forms of code signal combinations or from a simultaneous code signal combination transmitter.

12. In a receiving and translating mechanism: a plurality of two position members positioned in accordance with the units of a code signal combination; a plurality of permutation code devices having two positions and controlling selection of a mechanical telegraph operation; a transfer mechanism adapted to transfer the position of said two position members to said two position code devices; a power driven shaft; a function shaft; a positive action clutch means adapted to drive connect said power shaft and said function shaft; a latch device adapted to retain said transfer mechanism out of engagement with said two position members and to maintain said positive action clutch means in disengaged position; a solenoid device for releasing said latch mechanism to enable transfer of the setting of said two position members to said code devices and to start rotation of said function shaft; and means on said function shaft adapted to cooperate with said transfer mechanism for shifting said transfer mechanism back to latched position and including means rendered operative upon said transfer mechanism being shifted back to latched position to disengage said positive clutch means at the end of the operative cycle.

13. In a receiving and translating mechanism: a plurality of selector members positioned in accordance with the units of a code signal combination; a plurality of permutation code devices having two positions and controlling selection of a mechanical telegraph operation; a transfer mechanism adapted to transfer the position of said selector members to said two position code devices; a power driven shaft; a function shaft; a positive action clutch means adapted to drive connect said power shaft and said function shaft; a latch device adapted to retain said transfer mechanism out of engagement with said selector members and to maintain said positive action clutch means in disengaged position; an electrically energized device having a control circuit for releasing said latch mechanism to enable transfer of the setting of said selector members to said code devices and to start rotation of said function shaft; means to energize said control circuit immediately after positioning of said selector members; and means on said function shaft adapted to cooperate with said transfer mechanism for shifting said transfer mechanism back to latched position and including means rendered operative upon said transfer mechanism being shifted back to latched position to disengage said positive clutch means at the end of one operative cycle.

14. Signal data communication equipment including: a sequential receiving means comprising a mechanical means for storing sequentially received code signal combinations; a code signal device bank including a plurality of two position signal devices equal in number to the code signals in said code signal combinations; means for simultaneously transferring said stored received signals to positions in said code signal device bank; a mechanism for simultaneously receiving a code signal combination and translating said simultaneously received code signal combination into a mechanical operation; and means selectively operative to actuate said simultaneous receiving and translating mechanism from said code signal bank or from an external transmitter including means rendering said sequential receiving means inoperative upon selection of actuation of said simultaneous receiving and translating mechanism by said external transmitter.

15. A signal data receiving selector mechanism comprising: a plurality of selecting devices adapted to be positioned in accordance with received signal combinations; a plurality of code devices; means positioned by permutative positioning of said code devices adapted to block rotation of a type and function selecting shaft at specific predetermined angular positions; a simultaneous electrical code receiving solenoid device having a plurality of solenoid plungers corresponding in number to said selecting devices and connected therewith to position said selecting devices in accordance with a group of incoming simultaneous code signals; means operative immediately after reception of said simultaneous group of code signals to transfer the position of said selecting devices to said code devices and means for resetting said transfer mechanism.

16. A signal data receiving mechanism comprising: a single relay sequential receiving translator for receiving sequential code signal combinations and translating said code combinations to mechanical settings, including storage means with code switch devices; means for simultaneously closing a circuit to all of said code switch devices; a unitary two position multi-solenoid plunger device having means for permutatively positioning the plungers operatively connected with said code switch devices and simultaneously energized upon closure of a circuit to said code switch means; and a plurality of selecting devices having two positions and permutatively positioned in accordance with said solenoid plunger positions.

17. In the receiving mechanism as defined in claim 16, a control switching system whereby said multi-solenoid device can be adapted for reception of simultaneous signals directly; and means are included in said control switching system to render said sequential receiving translator ineffective.

18. A signal data receiving mechanism comprising: a power driven shaft; a cam shaft; a function shaft; a selecting shaft; a friction clutch means connecting said function shaft to said selecting shaft; a receiving and translator means cooperating with said cam shaft for receiving sequential code signal combinations and translating said code signal combinations to mechanical settings, including a transfer mechanism and storage means with code switch devices positioned by said transfer mechanism; means for simultaneously energizing circuits to all of said positioned code switch devices; a unitary two position multi-solenoid plunger device, having means for permutatively positioning said plungers operatively connected with said code switch means and simultaneously energized upon energization of said code switch devices; a plurality of selecting devices having two positions and permutatively positioned in accordance with said solenoid plunger positions; a plurality of code devices; a transfer means, in operative connection with said plurality of code devices, adapted to be moved from a latched position into engagement with said selecting devices to thereby permutatively position said code devices; means actuated immediately after simultaneous energization of said solenoid device for enabling engagement of said positive clutch means to rotate said function shaft and to release said second transfer means from latched position; means rendered operative upon rotation of said function shaft to reset said transfer means in latched position; means controlled by said code devices for positioning said selecting shaft at an angular position in accord with the character of the incoming code signal combination; and means operated upon completion of the cycle of rotation of said function shaft to disengage its associated positive clutch means.

References Cited by the Examiner

UNITED STATES PATENTS

| | | | |
|---|---|---|---|
| 2,329,652 | 9/43 | Reiber | 178—29 |
| 2,759,046 | 8/56 | Berke | 178—33 |

ROBERT H. ROSE, *Primary Examiner.*

NEWTON N. LOVEWELL, *Examiner.*